(12) United States Patent
Chang et al.

(10) Patent No.: US 8,218,423 B2
(45) Date of Patent: Jul. 10, 2012

(54) RANGING APPARATUS AND METHOD FOR IMPROVING RANGING PERFORMANCE IN OFDMA SYSTEM

(75) Inventors: Kyung Hi Chang, Seoul (KR); Jong Hun Kim, Suwon-si (KR); Young Bum Kim, Incheon (KR)

(73) Assignee: INHA-Industry Partnership Institute, Incheon (KR)

( * ) Notice: Subject to any disclaimer, the term of this patent is extended or adjusted under 35 U.S.C. 154(b) by 354 days.

(21) Appl. No.: 12/637,624

(22) Filed: Dec. 14, 2009

(65) Prior Publication Data

US 2011/0058470 A1      Mar. 10, 2011

(30) Foreign Application Priority Data

Sep. 4, 2009    (KR) .................. 10-2009-0083468

(51) Int. Cl.
*H04J 11/00* (2006.01)
(52) U.S. Cl. ................ 370/208; 370/328; 375/260
(58) Field of Classification Search .............. 370/203, 370/208–210, 328–338; 375/260
See application file for complete search history.

(56) References Cited

U.S. PATENT DOCUMENTS

| | | | | |
|---|---|---|---|---|
| 2007/0133460 A1* | 6/2007 | Sohn et al. | ..................... | 370/329 |
| 2010/0046431 A1* | 2/2010 | Moon et al. | ..................... | 370/328 |

OTHER PUBLICATIONS

Pulin Patel and Jack Holtzman, "Analysis of a Simple Successive Interference Cancellation Scheme in a DS/CDMA System", IEEE Journal on Selected Areas in Communications, vol. 12, No. 5, Jun. 1994, pp. 798-807.

Hisham A. Mahmoud; et al., "Initial Ranging for WiMAX (802.16e) OFDMA", pp. 1-7.
Xiaoyu Fu and Hlaing Minn, "Initial Uplink Synchronization and Power Control (Ranging Process) for OFDMA systems", IEEE Communications Society, Globecom 2004, pp. 3999-4003.
Doo Hwan Lee and Hiroyuki Morikawa, "OFDMA Ranging Performance Enhancement at the Cell Boundary in IEEE 802.16e system", 2006, p. 469.
Doo Hwan Lee and Hiroyuki Morikawa, "Performance Analysis of Ranging Process in IEEE 802.16e OFDMA Systems", IEEE Computer Society, Third IEEE International Conference on Wireless and Mobile Computing, Networking and Communications (WiMob 2007).
Xiangyang (Jeff) Zhuang, et. al., "Ranging Improvement for 802.16e OFDMA PHY", IEEE 802.16 Broadband Wireless Access Working Group, Jun. 25, 2004, pp. 1-32.

* cited by examiner

*Primary Examiner* — Pao Sinkantarakorn
(74) *Attorney, Agent, or Firm* — H.C. Park & Associates, PLC

(57) ABSTRACT

Disclosed herein is a ranging apparatus and method. The ranging apparatus includes a correlation unit for correlating OFDMA reception signals with inverse fast Fourier transformed ranging codes, and outputting correlation result values. A threshold determination unit determines a threshold value depending on characteristics of the reception signals. A comparison unit estimates a delay time by selecting a maximum value from among the correlation result values, and detects a ranging code by comparing the maximum value with the threshold value, and then outputs and feeds back the ranging code and the delay time when the maximum value is equal to or greater than the threshold value. A weight multiplication unit delays the ranging code by the delay time, multiplies a weight by the delayed ranging code, and outputs a resulting value. A calculation unit subtracts the resulting value from the reception signals, and provides adjusted reception signals.

12 Claims, 10 Drawing Sheets

RANGING APPARATUS AND METHOD FOR IMPROVING RANGING PERFORMANCE IN OFDMA SYSTEM

CROSS-REFERENCES TO RELATED APPLICATION

This patent application claims the benefit of priority under 35 U.S.C. §119 from Korean Patent Application No. 10-2009-0083468 filed on Sep. 4, 2009, the contents of which are incorporated herein by reference.

BACKGROUND OF THE INVENTION

1. Field of the Invention

The present invention relates, in general, to a ranging apparatus and method for improving ranging performance in an Orthogonal Frequency-Division Multiple Access (OFDMA) system, and, more particularly, to a ranging apparatus and method for improving the function of detecting ranging codes and delay times in an OFDMA system.

2. Description of the Related Art

An Orthogonal Frequency-Division Multiple Access (OFDMA) system is a scheme for multiple user access which assigns sub-channels, each implemented by setting a group of sub-carriers as a single set, to respective users while using a larger number of sub-carriers than a conventional Orthogonal Frequency Division Multiple (OFDM) system (for example, IEEE 802.11a).

An OFDMA system requires the strict synchronization of a frequency with a symbol among multiple users who use a single OFDMA symbol while maintaining orthogonality between sub-carriers in the symbol. When the OFDMA symbol of one user is not synchronized with the OFDMA symbols of other users, the OFDMA symbol of that user acts as multiple access interference on the other users, and becomes a principal factor causing the degradation of the entire performance of a mobile communication system (for example, M-WiMAX, Wibro, etc.).

The above-described multiple access interference may occur even in the symbols of users who communicate with a base station after uplink synchronization has been achieved. However, there is a higher possibility that multiple access interference will occur in the symbols of users who perform an initial ranging procedure while communicating with the base station when uplink synchronization is not achieved yet. Therefore, in the multi-user environment of an OFDMA system in which multiple access interference occurs, a base station needs a method for preventing the degradation of the performance of a mobile communication system by detecting more accurate ranging codes and by estimating more accurate delay times for respective users during initial ranging procedures for the users.

A ranging method in a conventional mobile communication system is configured to perform Fast Fourier Transform (FFT) on signals received from a plurality of user terminals, extracting ranging channel signals from the FFT-transformed signals, compensating for linear phase components, and correlating resulting values with ranging codes. During this process, the maximum value of correlation result values is compared with a preset fixed threshold value, so that a ranging code is detected and a delay time is estimated. However, since this method is configured to compare correlation result values with the preset fixed threshold value, it is difficult to detect an accurate ranging code and estimate an accurate delay time when reception signals vary due to the influences of the characteristics of reception signals, multiple access interference, noise, etc. Therefore, such a method is problematic in that the degradation of the performance of a mobile communication system increases.

SUMMARY OF THE INVENTION

Accordingly, the present invention has been made keeping in mind the above problems occurring in the prior art, and an object of the present invention is to provide a ranging apparatus and method, which correlate reception signals with ranging codes, output corresponding correlation result values, determine a threshold value adaptively varying with the reception signals, and output and feed back both a detected ranging code and an estimated delay time on the basis of the results of the comparison between the correlation result values and the threshold value, thus more accurately detecting ranging codes and estimating delay times in a multi-user environment.

In order to accomplish the above object, the present invention provides a ranging apparatus in an Orthogonal Frequency-Division Multiple Access (OFDMA) system, comprising a correlation unit for correlating OFDMA reception signals with inverse fast Fourier transformed ranging codes, and outputting correlation result values, a threshold determination unit for determining a threshold value depending on characteristics of the reception signals input to the correlation unit, a comparison unit for estimating a delay time by selecting a maximum value from among the correlation result values output from the correlation unit, and detecting a ranging code by comparing the maximum value with the threshold value, and then outputting and feeding back the detected ranging code and the estimated delay time when the maximum value is equal to or greater than the threshold value, a weight multiplication unit for delaying the ranging code fed back from the comparison unit by the delay time, multiplying a weight by the delayed fed-back ranging code, and outputting a resulting value, and a calculation unit for subtracting the resulting value provided by the weight multiplication unit from the reception signals, and providing adjusted reception signals to the correlation unit.

Preferably, the comparison unit estimates the delay time corresponding to the maximum value of the correlation result values output from the correlation unit by using the following equation:

$$\hat{\tau}_m = \text{argmax}\{|r_m(\tau_m)|: \tau=0, \ldots, \tau_{max}\}$$

where $r_m(\tau_m)$ is each correlation result value.

Preferably, the comparison unit detects the ranging code using the estimated delay time, the ranging code being detected by the following equation:

$$|r_m(\hat{\tau}_m)| = \begin{cases} |S_m + I + W|, & m \in \hat{C}_i \\ |I + W|, & \text{otherwise} \end{cases}$$

$$\hat{C}_i = |r_m(\hat{\tau}_m)| > \eta$$

where $r_m(\hat{\tau}_m)$ is a correlation result value at the estimated delay time $\tau_m$, $S_m$ is a ranging code, I is multiple access interference, W is Additional White Gaussian Noise (AWGN), and $\eta$ is the threshold value.

Preferably, the weight multiplication unit delays the fed-back ranging code by the delay time and multiplies the weight by the delayed ranging code to output the resulting value, which is represented by the following equation:

$$\alpha \cdot S_m(t-\hat{\tau}_m)$$

where $\alpha$ is the weight, and $S_m(t-\hat{\tau}_m)$ is a signal delayed by the estimated delay time $\hat{\tau}_m$.

Preferably, the calculation unit provides to the correlation unit the adjusted reception signals which are represented by the following equation:

$$r_{M-1}(t) = r_M(t) - \alpha \cdot S_m(t-\hat{\tau}_m)$$

Preferably, the threshold determination unit determines the threshold value depending on the reception signals and multiple access interference characteristics and Additional White Gaussian Noise (AWGN) characteristics of the reception signals.

Further, the present invention provides a ranging method in an Orthogonal Frequency-Division Multiple Access (OFDMA) system, comprising a first step of correlating OFDMA reception signals with inverse fast Fourier transformed ranging codes, and outputting correlation result values, a second step of determining a threshold value depending on characteristics of the reception signals, a third step of estimating a delay time by selecting a maximum value from among the correlation result values, a fourth step of, if the maximum value is equal to or greater than the threshold value when the maximum value is compared with the threshold value, detecting a ranging code, and outputting and feeding back the detected ranging code and the estimated delay time, a fifth step of delaying the fed-back ranging code by the delay time, multiplying a weight by the delayed fed-back ranging code, and then providing a resulting value, and a sixth step of subtracting the resulting value from the reception signals, generating adjusted reception signals, and repeating the first to fifth steps with respect to the adjusted reception signals.

Preferably, the third step is performed to estimate the delay time corresponding to the maximum value of the correlation result values by using the following equation:

$$\hat{\tau}_m = \mathrm{argmax}\{|r_m(\tau_m)| : \tau=0, \ldots, \tau_{max}\}$$

where $r_m(\tau_m)$ is each correlation result value.

Preferably, the fourth step is performed to detect the ranging code using the estimated delay time, the ranging code being detected by the following equation:

$$|r_m(\hat{\tau}_m)| = \begin{cases} |s_m + I + W|, & m \in \hat{C}_i \\ |I + W|, & \text{otherwise} \end{cases}$$

$$\hat{C}_i = |r_m(\hat{\tau}_m)| > \eta$$

where $r_m(\hat{\tau}_m)$ is a correlation result value at the estimated delay time $\tau_m$, $S_m$ is a ranging code, I is multiple access interference, W is Additional White Gaussian Noise (AWGN), and $\eta$ is the threshold value.

Preferably, the fifth step is performed to delay the fed-back ranging code by the delay time and multiply the weight by the delayed ranging code to output the resulting value, which is represented by the following equation:

$$\alpha \cdot S_m(t-\hat{\tau}_m)$$

where $\alpha$ is the weight, and $S_m(t-\hat{\tau}_m)$ is a signal delayed by the estimated delay time $\hat{\tau}_m$.

Preferably, the sixth step is performed to repeat the first to fifth steps with respect to the adjusted reception signals represented by the following equation:

$$r_{M-1}(t) = r_M(t) - \alpha \cdot S_m(t-\hat{\tau}_m)$$

Preferably, the second step is performed to determine the threshold value depending on the reception signals and multiple access interference characteristics and Additional White Gaussian Noise (AWGN) characteristics of the reception signals.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Hereinafter, embodiments of the present invention will be described in detail with reference to the attached drawings.

Figure 1:
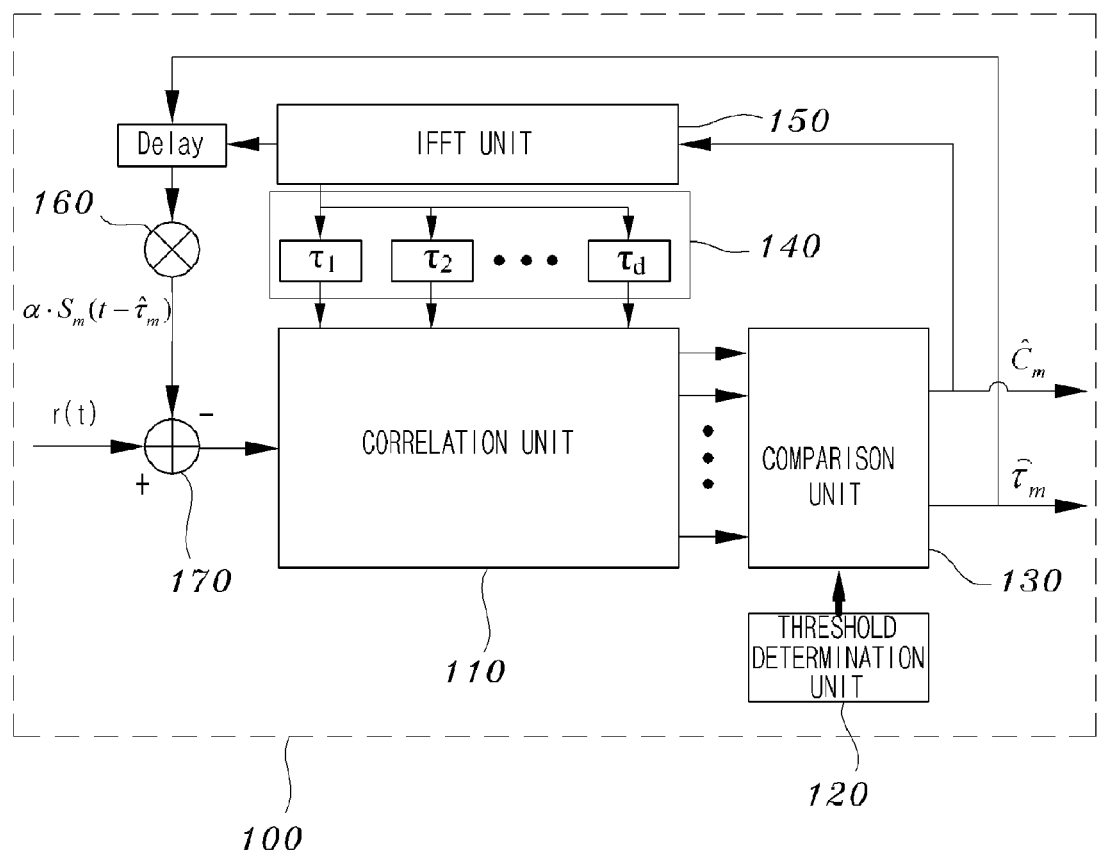
FIG. 1 is a diagram showing the construction of a ranging apparatus according to an embodiment of the present invention.

FIG. 1 is a diagram showing the construction of a ranging apparatus according to an embodiment of the present invention. Referring to FIG. 1, a ranging apparatus 100 is a device for processing OFDMA reception signals input from a plurality of user terminals (not shown), detecting ranging codes required for ranging, estimating delay times, and transmitting the ranging codes and the delay times to the user terminals, thus enabling initial ranging to be processed. Such a ranging apparatus 100 may be an apparatus included in a base station (not shown).

Referring to FIG. 1, the ranging apparatus 100 includes a correlation unit 110, a threshold determination unit 120, a comparison unit 130, a delay time input unit 140, an Inverse Fast Fourier Transform (IFFT) unit 150, a weight multiplication unit 160, and a calculation unit 170. The ranging apparatus 100 of FIG. 1 detects ranging codes required to process the ranging of the plurality of user terminals and estimates delay times by using the OFDMA reception signals input from the user terminals.

The correlation unit 110 correlates the OFDMA reception signals with IFFT-transformed ranging codes, and outputs correlation result values. In this case, the correlation of the respective OFDMA reception signals input from the user terminals with the IFFT-transformed ranging codes can be represented by the following Equation (1), $$r_m(t) = S_m(t) r(t) \qquad (1)$$

where $S_m(t)$ is the IFFT-transformed ranging code of an m-th user terminal, and r(t) is an OFDMA reception signal input from the user terminals.

The delay time input unit 140 sequentially inputs delay times ranging from $\tau_1$ to $\tau_d$ to the correlation unit 110 at time t while the correlation unit 110 performs correlation at the time t.

The threshold determination unit 120 determines a threshold value depending on the characteristics of the reception signals input to the apparatus 100, that is, the OFDMA reception signals input to the correlation unit 110. In detail, the characteristics of the reception signals may include the signal terms of the reception signals and the multiple access interference and Additional White Gaussian noise (AWGN) of the reception signals. Accordingly, the threshold value is determined to adaptively vary depending on the above characteristics. Such a threshold value can be determined by the following Equation (2), $$\eta = \frac{|I+W| + |s_m + I + W|}{2}, \quad (2)$$

$$|I+W| = \frac{\sum_{\tau=0}^{\tau_{max}-1} |r_q(\tau)|}{\tau_{max}}$$

where $s_m$ is a signal term dependent on both the magnitude and impulse response of the reception signal, I is multiple access interference, W is AWGN, and q is the index of a ranging code having the minimum value of the correlation result values.

The comparison unit 130 estimates a delay time by selecting the maximum value from among the correlation result values output from the correlation unit 110. In detail, the delay time corresponding to the maximum value of the correlation result values, that is, the delay time, at which the correlation result value is maximized, among the delay times input from the delay time input unit 140, is estimated to be the delay time of the m-th user terminal. Such a delay time may be estimated by the following Equation (3), $$\hat{\tau}_m = \text{argmax}\{|r_m(\tau_m)|: \tau=0, \ldots, \tau_{max}\} \quad (3)$$

where $\text{arg max}\{|r_m(\tau_m)|\}$ is the maximum value of the correlation result values.

Meanwhile, when the delay time is estimated, the comparison unit 130 detects a ranging code by comparing the maximum value of the correlation result values with the threshold value. In detail, when the maximum value of the correlation result values is equal to or greater than the threshold value, a ranging code having the maximum value is detected as a ranging code transmitted by the m-th user terminal. In this case, at the time of performing comparison with the threshold value, the ranging code may be an absolute value of the maximum value of the correlation result values, and can be detected by the following Equation (4), $$\hat{C}_i = |r_m(\hat{\tau}_m)| > \eta \quad (4)$$

$$|r_m(\hat{\tau}_m)| = \begin{cases} |s_m + I + W|, & m \in \hat{C}_i \\ |I + W|, & \text{otherwise} \end{cases}$$

where $|r_m(\hat{\tau}_m)|$ is the absolute value of the correlation result value corresponding to $\tau_m$, $S_m$ is a signal term, I is multiple access interference, and W is Additional White Gaussian Noise (AWGN). The estimation of the delay time and the detection of the ranging code performed in this way can be achieved using the same method that is proposed in a thesis (published in December, 2004 by X. Fu, H. Minn, entitled "Initial uplink synchronization and power control (ranging process) for OFDMA system," in proc. IEEE GLOBECOM' 04, vol. 6, pp. 3999-4003) (hereinafter referred to as 'reference document 1').

Meanwhile, the comparison unit 130 performs the estimation of the delay time and the detection of the ranging code, and feeds back the ranging code and the delay time while outputting the ranging code and the delay time. In this case, the base station can process the ranging of the m-th user terminal using the output delay time and ranging code.

Further, the fed-back delay time and ranging code are used to adjust the OFDMA reception signals after passing through the IFFT unit 150, a delay unit, the weight multiplication unit 160 and the calculation unit 170.

In detail, the IFFT unit 150 performs IFFT on the fed-back ranging code so as to transform the ranging code from a frequency domain into a time domain so that the ranging code is correlated with the OFDMA reception signals in a subsequent process.

The delay unit delays the IFFT-transformed ranging code by the fed-back delay time.

The weight multiplication unit 160 multiples a weight by the ranging code received from the delay unit, and provides the resulting value of multiplication. The resulting value provided by the weight multiplication unit 160 can be represented by the following Equation (5), $$\alpha \cdot S_m(t-\hat{\tau}_m) \quad (5)$$

where $\alpha$ is a weight, and $S_m(t-\hat{\tau}_m)$ is the ranging code delayed by the estimated delay time $\hat{\tau}_m$. Here, the weight a can have a value which is greater than 0 and is equal to or less than 1.

The calculation unit 170 subtracts the resulting value provided by the weight multiplication unit 160 from the OFDMA reception signals input to the correlation unit 110, and provides adjusted reception signals to the correlation unit 110. In this case, the adjusted reception signals provided by the calculation unit 170 are represented by the following Equation (6), $$r_{M-1}(t) = r_M(t) - \alpha \cdot S_m(t-\hat{\tau}_m) \quad (6)$$

where $r_{M-1}(t)$ is obtained by excluding the reception signal related to the ranging code and the delay time of the m-th user terminal, which are respectively detected and estimated by the ranging processing, from the OFDMA reception signals input from the plurality of user terminals to the correlation unit 110. That is, when it is assumed that M OFDMA reception signals are initially input to the ranging apparatus 100, M−1 OFDMA reception signals are present in a first feedback procedure.

The correlation unit 110 correlates the adjusted reception signals with the ranging code, and the comparison unit 130 estimates a delay time by selecting the maximum value from among correlation result values. Further, the comparison unit 130 performs a procedure for detecting a ranging code by comparing the maximum value of the correlation result values with a threshold value. During this procedure, the threshold determination unit 120 determines a threshold value again using the adjusted reception signals and the multiple access interference characteristics and AWGN characteristics of the adjusted reception signals, and provides the determined threshold value to the comparison unit 130.

The above-described procedure for estimating a delay time and detecting a ranging code is performed until the maximum value of the correlation result values becomes less than the threshold value. When the above procedure is repeated, interference components, contained in OFDMA reception signals combined by multiple users who attempt ranging, gradually decrease, thus enabling the performance of ranging based on the estimation of delay times and the detection of ranging codes to be improved.

Figure 2:
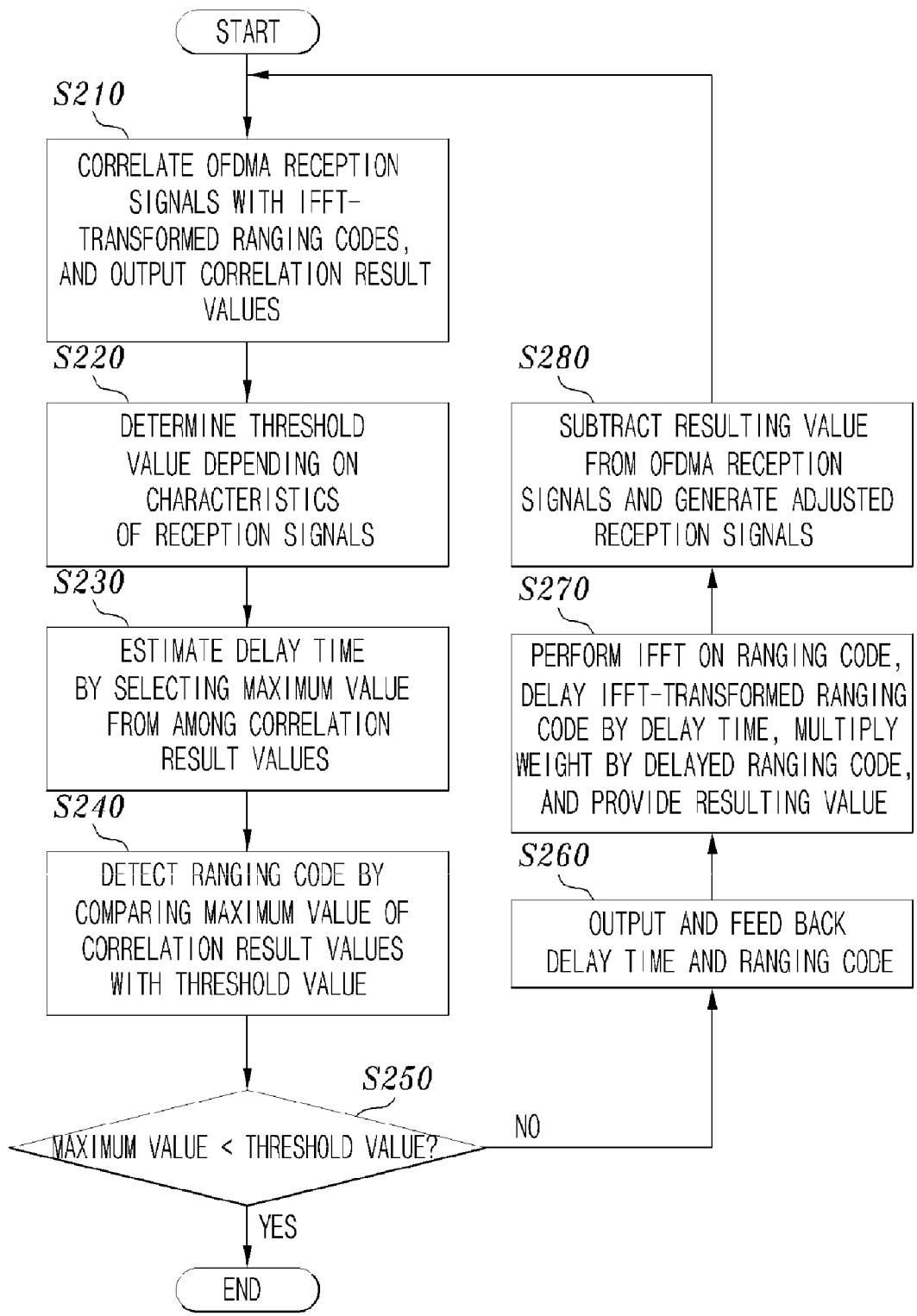
FIG. 2 is a flowchart showing a ranging method according to an embodiment of the present invention.

FIG. 2 is a flowchart showing a ranging method according to an embodiment of the present invention. FIG. 2 illustrates a ranging method in the uplink of a mobile communication system, which is performed in an apparatus included in a base station (not shown).

Referring to FIG. 2, input OFDMA reception signals are correlated with IFFT-transformed ranging codes, and then correlation result values are output at step S210.

Thereafter, a threshold value is determined depending on the characteristics of the input OFDMA reception signals at step S220.

Next, the maximum value is selected from among the correlation result values, and thus a delay time is estimated at step S230. Further, the maximum value of the correlation result values is compared with the threshold value, and thus a ranging code is detected at step S240.

Meanwhile, when the maximum value of the correlation result values is compared with the threshold value determined at step S220, and is equal to or greater than the threshold value at step S250, the estimated delay time and the detected ranging code are fed back while being output at step S260.

Next, the fed-back ranging code is IFFT transformed and is delayed by the estimated delay time, the delayed ranging code is multiplied by a weight, and the resulting value of multiplication is provided at step S270. Further, a calculation procedure for subtracting the provided resulting value from the OFDMA reception signals input at step S210 is performed, and thus adjusted reception signals are generated at step S280. A procedure ranging from step S210 to step S250 is repeatedly performed on the adjusted reception signals until the maximum value of the correlation result values becomes less than the threshold value.

Meanwhile, when the maximum value of the correlation result values is compared with the threshold value determined at step S220, and is less than the threshold value at step value S250, it is determined that the estimation of delay times and the detection of ranging codes performed on the OFDMA reception signals input through ranging channels have been completed, and thus the operation of the ranging apparatus is terminated.

Figure 3A:
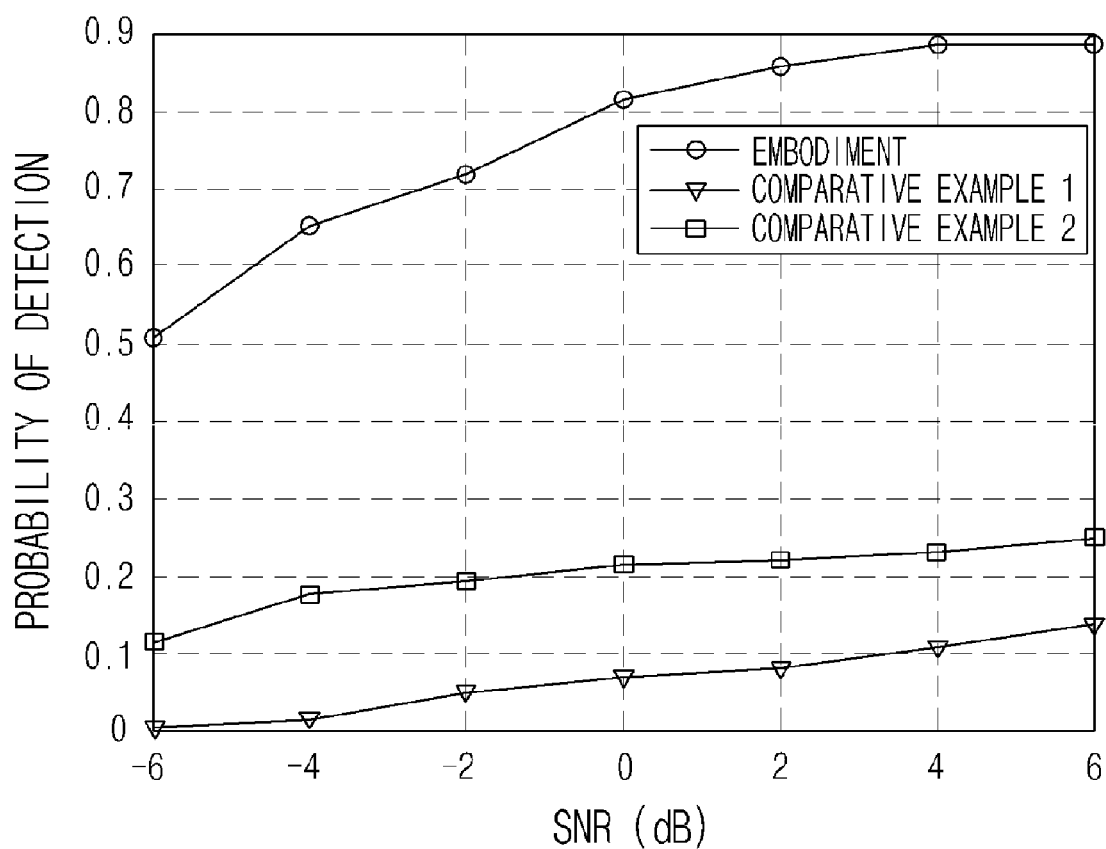
FIGS. 3A to 3C are graphs showing the ranging performance of first and second comparative examples and an embodiment of the present invention in a single cell.
Figure 3B:
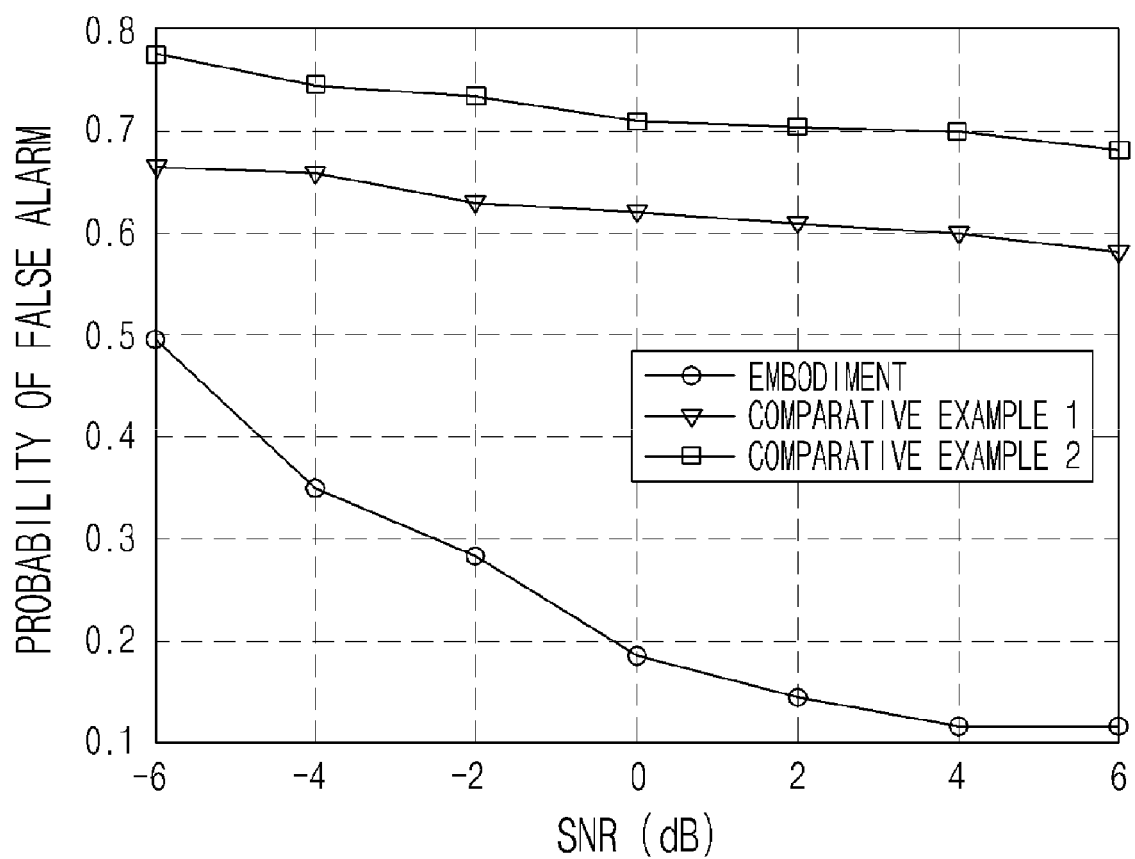
Figure 3C:
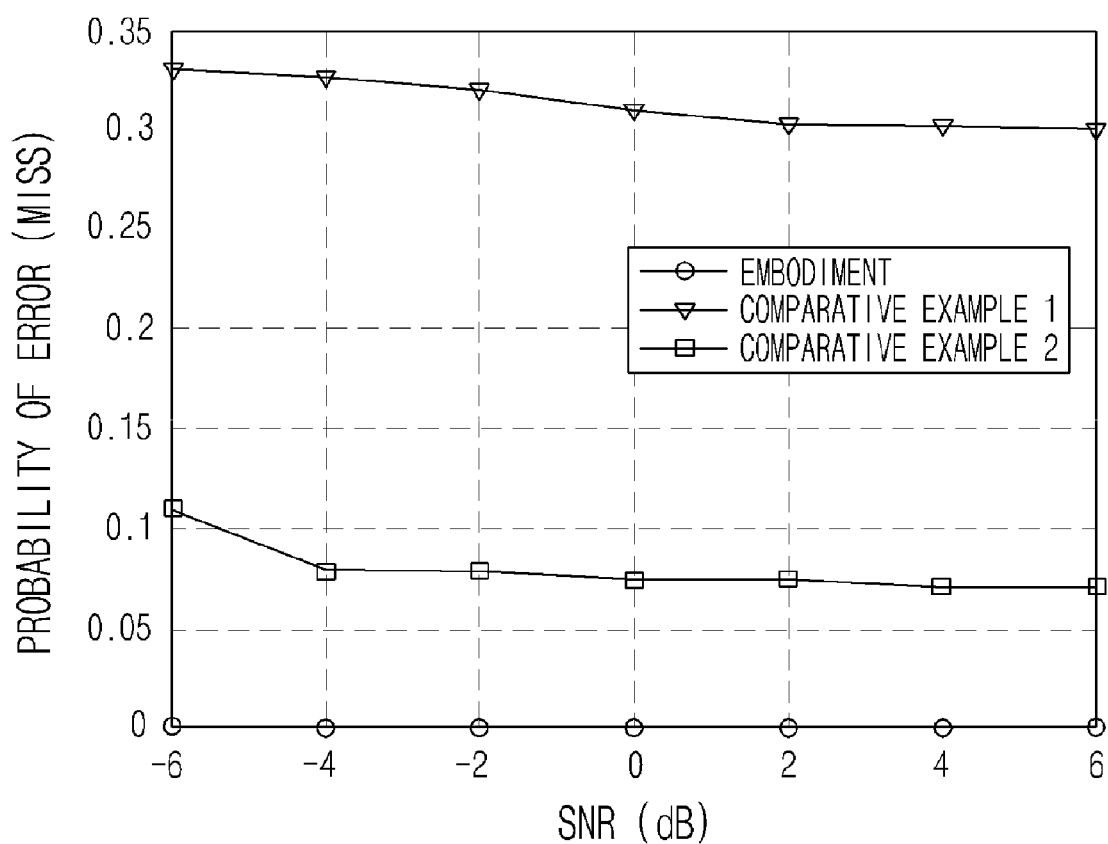
Figure 4:
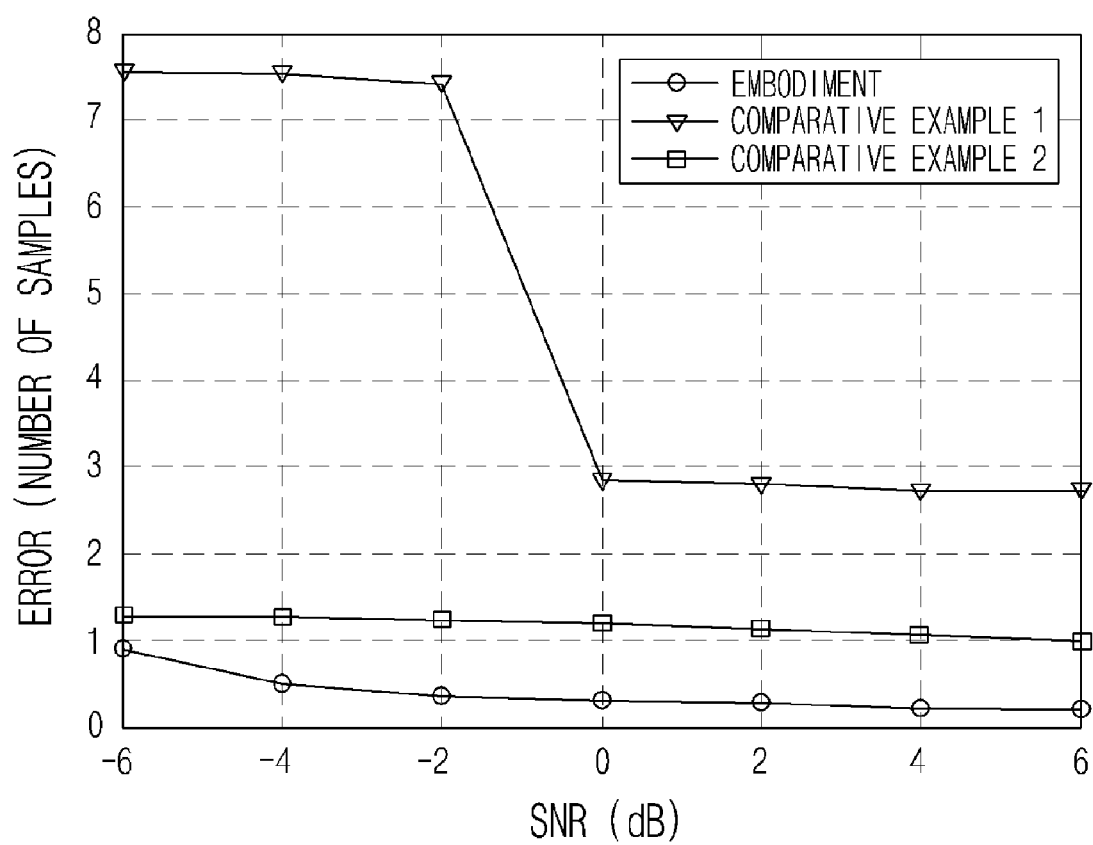
FIG. 4 is a graph showing errors occurring in the estimation of delay times in a single cell.

FIGS. 3A to 3C are graphs showing the ranging performance of first and second comparative examples and an embodiment of the present invention in a single cell. Ranging performance is required to verify the influence of interference on a single cell (or multiple cells), and may be represented by the probability of detection, the probability of false alarm, and the probability of error (or miss). Here, the term 'probability of detection' means the probability of detecting the ranging codes and estimating the delay times of all terminals in a single cell (or in multiple cells). The term 'probability of false alarm' means the probability of detecting the ranging codes of all terminals in a single cell (or in multiple cells), but causing errors in the estimation of the delay times of one or more terminals. The term 'probability of error' means the probability of causing errors in the detection of the ranging codes of one or more terminals. Further, FIG. 4 is a graph showing errors occurring in the estimation of delay times in a single cell.

FIG. 3A illustrates the probability of detection, FIG. 3B illustrates the probability of false alarm, and FIG. 3C illustrates the probability of error. In FIGS. 3A to 3C, a first comparative example is related to a typical ranging method, and a second comparative example is related to a ranging method which uses an adaptively varying threshold value and is disclosed in reference document 1. The embodiment is related to the present invention, which compares the maximum value of correlation result values with an adaptively varying threshold value while using the adaptively varying threshold value, and feeds back or outputs a detected ranging code and an estimated delay time on the basis of the results of the comparison.

In FIGS. 3A to 3C, an environment for the implementation of ranging of the first comparative example, the second comparative example and the embodiment of the present invention will be described below. In detail, in order to implement a Rayleigh fading environment, a Joint Technical Committee (JTC) model is used, and terminals randomly select ranging codes and delay times from a ranging code set, including 255 ranging codes, and a delay time set, including a maximum of 200 samples, respectively.

Further, parameters used in experiments have values described in Table 1.

TABLE 1

| Parameter | Value |
|---|---|
| Center frequency | 2.3 GHz |
| System bandwidth | 10 MHz |
| FFT size | 1024 |
| Sub-channel assignment method | PUSC |
| Weight ($\alpha$) | 0.02 |
| Cell radius | 1 Km |
| Cell overlapping area | 100 $\mu$ |
| Maximum number of users | 8 |
| Fading channel | ITU-P M.1225 Veh-A 60 Km/$\eta$ |
| Path loss model | ITU-P M.1225- Path loss model (vehicular test environment) $A = 40(1 - 4 \cdot 10^{-3} \cdot \Delta h_b)\lambda o \gamma_{10} P - 18 \log_{10} \Delta h_b + 21 \log_{10} f + 80$ |
| Antenna gain | $\gamma(\theta) = -\mu v[12((\theta/\theta_{3dB})^2, A_m)]$ $A_m = 20$ dB, $\theta_{3dB} = 60°$ BS: Directional Ant., MS: Omni Anti |

Referring to the graph of FIG. 3A, in the case of the probability of detection relative to variation in a Signal-to-Noise Ratio (SNR), the first comparative example has a value of 0 to 0.15, the second comparative example has a value of 0.1 to 0.25, and the embodiment of the present invention has a value of 0.5 to 0.9 in a range from −6 dB to 6 dB. In this case, as the probability of detection approaches 1, the rate of ranging code detection and delay time estimation is high. In consideration of this relationship, it can be seen that, when being compared with the first and second comparative examples, the embodiment of the present invention has an improved probability of detection.

Referring to the graph of FIG. 3B, in the case of the probability of false alarm relative to variation in SNR, the first comparative example has a value of 0.55 to 0.7, the second comparative example has a value of 0.65 to 0.8, and the embodiment of the present invention has a value of 0.1 to 0.5 in a range from −6 dB to 6 dB. As the probability of false alarm approaches 0, the rate of errors in the estimation of delay times is low. In consideration of this fact, it can be seen that, when being compared with the first and second comparative examples, the embodiment of the present invention has a reduced probability of false alarm, and thus ranging performance is improved.

Referring to the graph of FIG. 3C, in the case of the probability of error relative to variation in SNR, the first comparative example has a value of 0.3 to 0.35, the second comparative example has a value of 0.05 to 0.15, and the embodiment of the present invention has a value approximate to 0 in a range from −6 dB to 6 dB. Similarly to the probability of false alarm, as the probability of error approaches 0, the rate of errors in the detection of ranging codes is low. Therefore, referring to FIG. 3C, it can be seen that the embodiment has the probability of error lower than that of the first and second comparative examples, and thus ranging performance is improved.

Referring to the graph of FIG. 4, the first comparative example causes errors corresponding to two to eight samples of all samples, in the SNR range from −6 dB to 6 dB, the second comparative example causes errors corresponding to one to two samples of all samples, and the embodiment causes errors corresponding to one or fewer samples of all samples. In this case, as the value of errors in the estimation of delay times decreases, the estimation of delay times is accurate. When this fact is taken into consideration, it can be seen that the estimation of delay times according to the embodiment of the present invention becomes accurate compared to the first and second comparative examples.

Figure 5A:
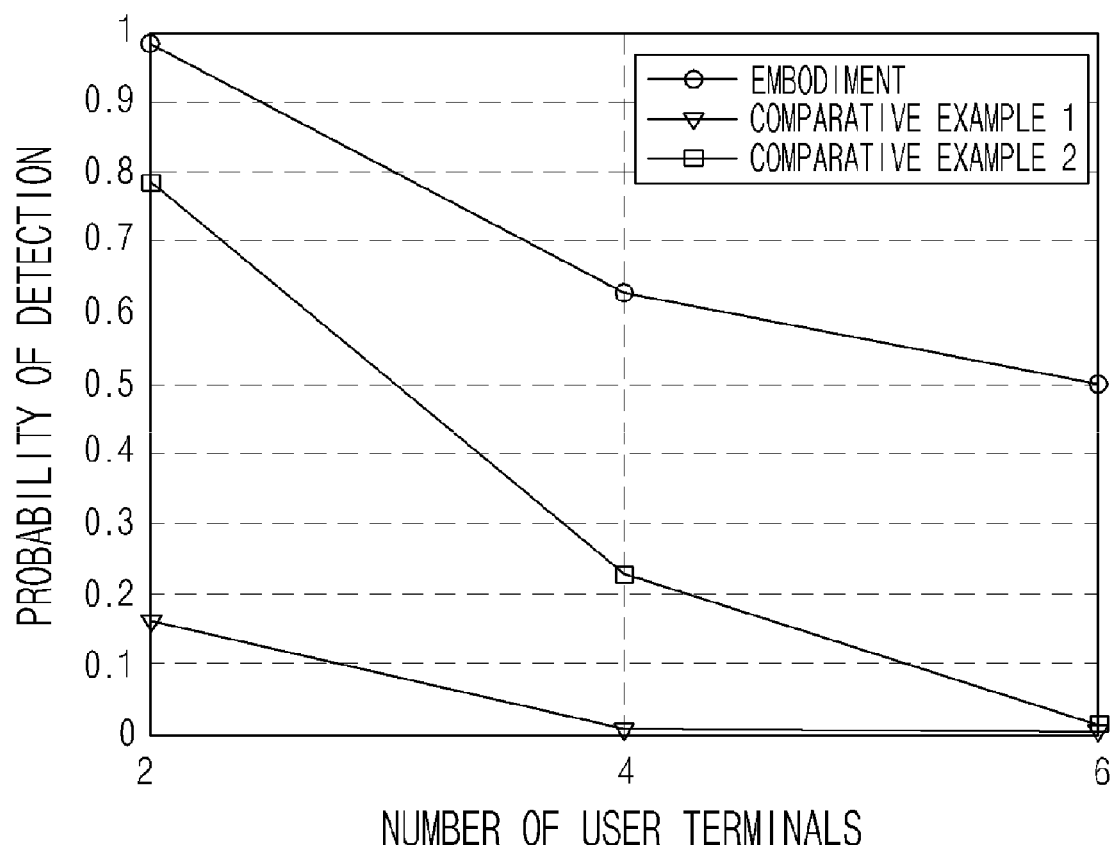
FIGS. 5A to 5C are graphs showing the ranging performance of first and second comparative examples and an embodiment of the present invention relative to the number of user terminals in multiple cells.
Figure 5B:
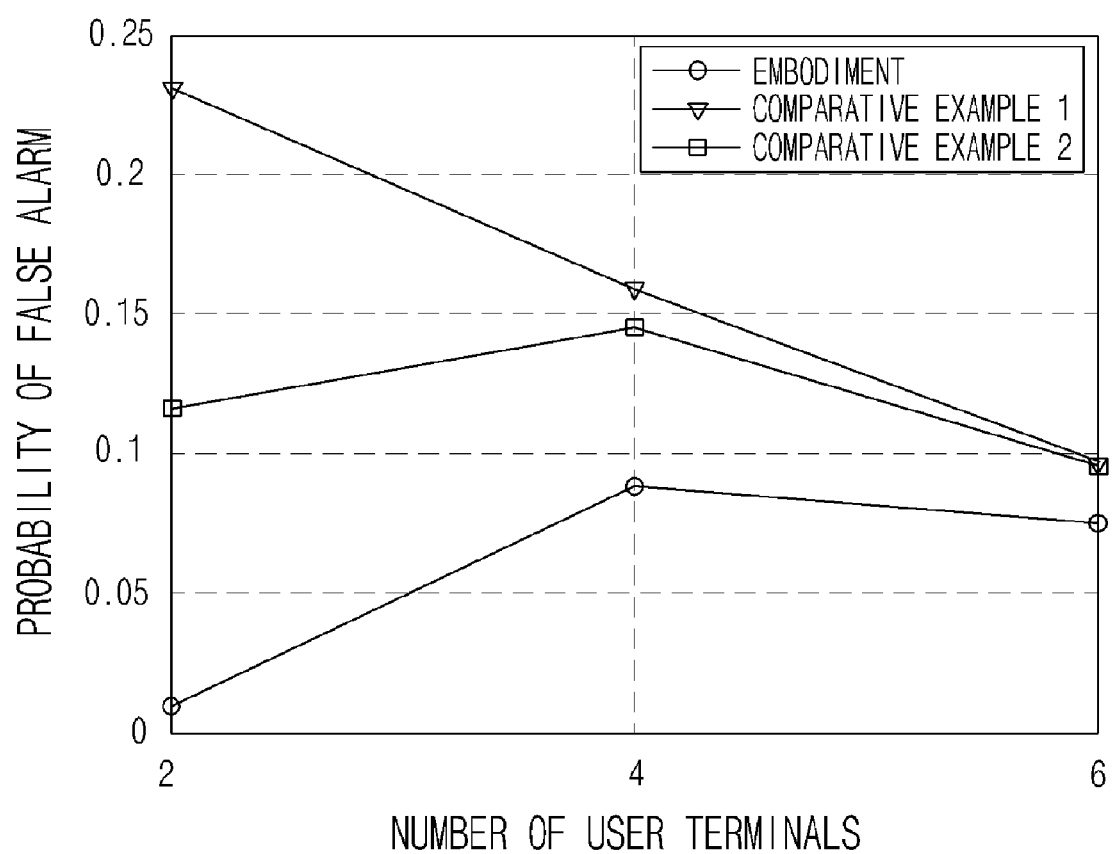
Figure 5C:
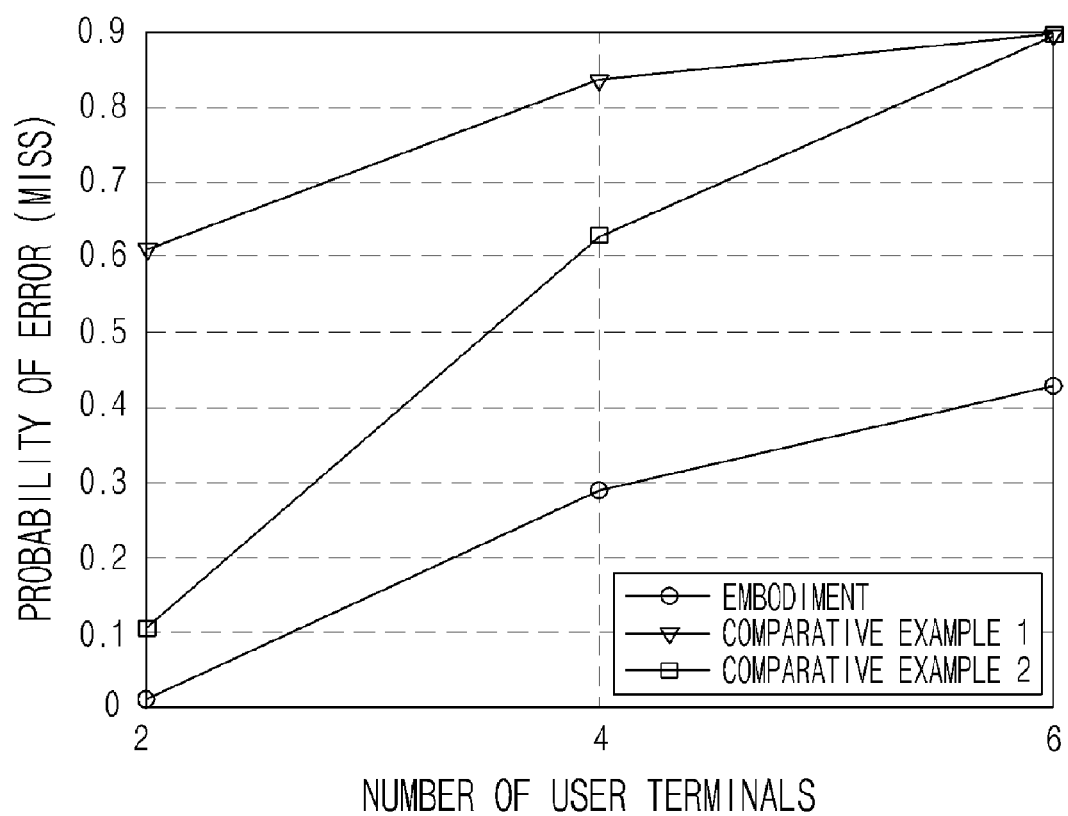

FIGS. 5A to 5C are graphs showing the ranging performance of first and second comparative examples and an embodiment of the present invention relative to the number of user terminals in multiple cells.

Meanwhile, an environment and parameters for the implementation of ranging, which are applied to a process for conducting experiments on ranging performance relative to the number of user terminals in multiple cells, are set to the same environment and parameters as those of the single cell. Further, it is assumed that user terminals are located in two cells and that, when the number of user terminals increases to two, four and eight, the half of user terminals are located in a first cell, and the remaining half of the user terminals are located in a second cell. Accordingly, in order to eliminate interference with an adjacent cell, it is assumed that the base station of the first cell knows ranging codes obtained by the adjacent second cell.

FIGS. 5A to 5C are graphs showing the ranging performance of first and second comparative examples and an embodiment of the present invention, wherein FIG. 5A illustrates the probability of detection, FIG. 5B illustrates the probability of false alarm, and FIG. 5C illustrates the probability of error (or miss). In this case, the first and second comparative examples and the embodiment are identical to those of FIGS. 3A to 3C.

Referring to the graph of FIG. 5A, in the case of the probability of detection relative to the number of user terminals in multiple cells, the first comparative example has a value of 0 to 0.2, the second comparative example has a value of 0 to 0.8, and the embodiment has a value of 0.5 to 1. Therefore, it can be seen that, when being compared with the first and second comparative examples, the embodiment has an improved probability of detection.

Referring to the graph of FIG. 5B, in the case of the probability of false alarm relative to the number of user terminals in multiple cells, the first comparative example has a value of 0.1 to 0.25, the second comparative example has a value of 0.1 to 0.15, and the embodiment of the present invention has a value of 0 to 0.1. Therefore, it can be seen that, when being compared with the first and second comparative examples, the embodiment of the present invention has a reduced probability of false alarm, and thus ranging performance is improved.

Referring to the graph of FIG. 5C, in the case of the probability of error relative to the number of user terminals in multiple cells, the first comparative example has a value of 0.6 to 0.9, the second comparative example has a value of 0.1 to 0.9, and the embodiment of the present invention has a value of 0 to 0.5. As the probability of error approaches 0, the rate of errors in the detection of ranging codes is low, and thus this fact means that ranging performance is excellent.

Figure 6:
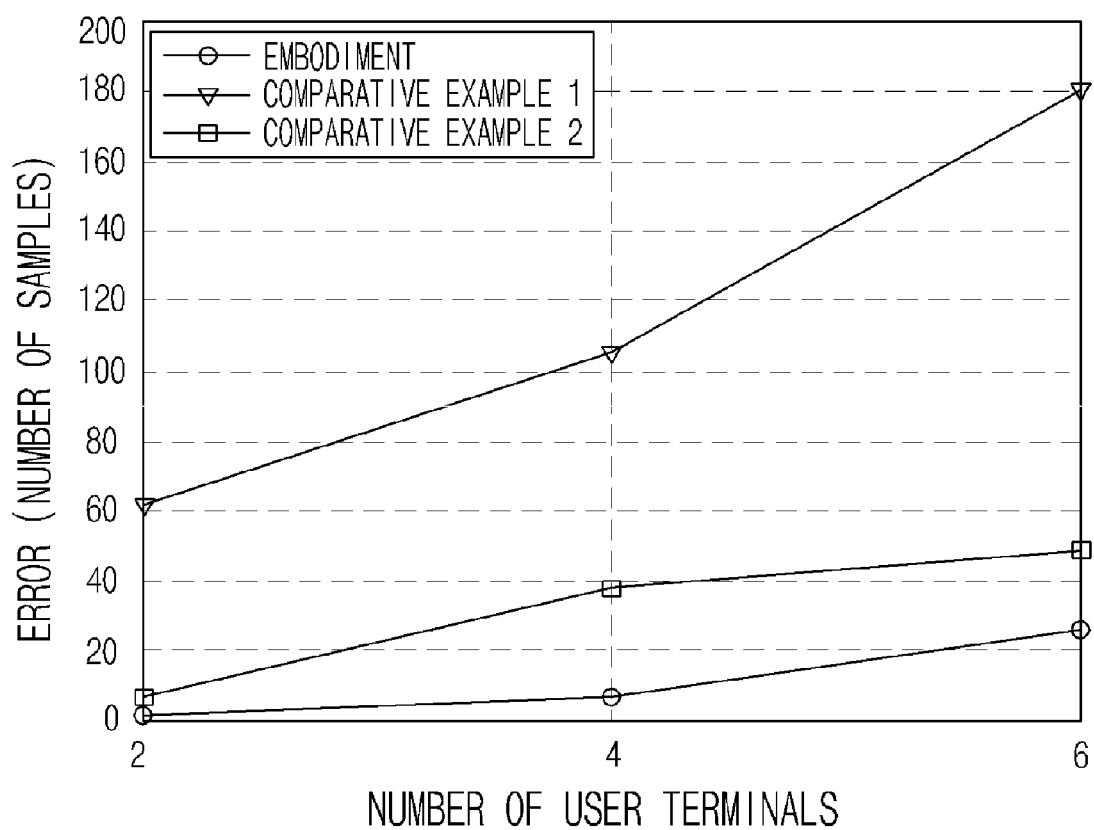
FIG. 6 is a graph showing errors occurring in the estimation of delay times relative to the number of user terminals in multiple cells.

FIG. 6 is a graph showing errors occurring in the estimation of delay times relative to the number of user terminals in multiple cells. Referring to the graph of FIG. 6, it can be seen that the first comparative example causes errors corresponding to 60 to 180 is samples of all samples, and the second comparative example causes errors corresponding to 60 or fewer samples of all samples. In contrast, the embodiment causes errors corresponding to 30 or fewer samples of all samples, and thus it can be seen that the estimation of delay times can be more accurately performed.

As described above, the present invention provides a ranging apparatus and method, which correlate OFDMA reception signals with ranging codes and output correlation result values corresponding thereto in the uplink ranging of an OFDMA system. Further, the ranging apparatus and method of the present invention output and feed back ranging codes and delay times on the basis of the results of the comparison between the correlation result values and a threshold value, and then adjust the reception signals. Accordingly, the present invention is advantageous in that multiple access interference can be reduced in a multi-user environment, so that the detection of more accurate ranging codes and the estimation of more accurate delay times can be achieved, thus improving ranging performance in a mobile communication system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

What is claimed is:

1. A ranging apparatus in an Orthogonal Frequency-Division Multiple Access (OFDMA) system, comprising:
   a correlation unit for correlating OFDMA reception signals with inverse fast Fourier transformed ranging codes, and outputting correlation result values;
   a threshold determination unit for determining a threshold value depending on characteristics of the reception signals input to the correlation unit;
   a comparison unit for estimating a delay time by selecting a maximum value from among the correlation result values output from the correlation unit, and detecting a ranging code by comparing the maximum value with the threshold value, and then outputting and feeding back the detected ranging code and the estimated delay time when the maximum value is equal to or greater than the threshold value;

a weight multiplication unit for delaying the ranging code fed back from the comparison unit by the delay time, multiplying a weight by the delayed fed-back ranging code, and outputting a resulting value; and a calculation unit for subtracting the resulting value provided by the weight multiplication unit from the reception signals, and providing adjusted reception signals to the correlation unit.

2. The ranging apparatus according to claim 1, wherein the comparison unit estimates the delay time corresponding to the maximum value of the correlation result values output from the correlation unit by using the following equation:

$$\hat{\tau}_m = \arg\max\{|r_m(\tau_m)|: \tau=0,\ldots,\tau_{max}\}$$

where m is the m-th user, $\tau$ is the delay time according to propagation distance (propagation delay time), $\tau_m$ is the propagation delay time of the m-th user, $\tau_{max}$ is the maximum delay time according to propagation distance (the maximum delay time), $\hat{\tau}_m$ is the estimated delay time corresponding to the maximum value of the correlation result values, and $r_m(\tau_m)$ is each correlation result value.

3. The ranging apparatus according to claim 2, wherein the comparison unit detects the ranging code using the estimated delay time, the ranging code being detected by the following equation:

$$|r_m(\hat{\tau}_m)| = \begin{cases} |s_m + I + W|, & m \in \hat{C}_i \\ |I + W|, & \text{otherwise} \end{cases}$$

$$\hat{C}_i = |r_m(\hat{\tau}_m)| > \eta$$

where $r_m(\hat{\tau}_m)$ is a correlation result value at the estimated delay time $\tau_m$, $S_m$ is a ranging code, I is multiple access interference, W is Additional White Gaussian Noise (AWGN), $\eta$ is the threshold value, and $\hat{C}_i$ is the absolute value of the correlation result value at the estimated delay time corresponding to the maximum value of the correlation result values, greater than the threshold value.

4. The ranging apparatus according to claim 1, wherein the weight multiplication unit delays the fed-back ranging code by the delay time and multiplies the weight by the delayed ranging code to output the resulting value, which is represented by the following equation:

$$\alpha \cdot S_m(t - \hat{\tau}_m)$$

where $\alpha$ is the weight, $S_m$ is a ranging code, t is time, and $S_m(t - \hat{\tau}_m)$ is a signal delayed by the estimated delay time $\hat{\tau}_m$.

5. The ranging apparatus according to claim 4, wherein the calculation unit provides to the correlation unit the adjusted reception signals which are represented by the following equation:

$$r_{M-1}(t) = r_M(t) - \alpha \cdot S_m(t - \hat{\tau}_m)$$

where $r_M(t)$ is the reception signal and $r_{M-1}(t)$ is the signal excluding the reception signal related to the ranging code and the delay time of an m-th user terminal and predicted by ranging process from among reception signals.

6. The ranging apparatus according to claim 1, wherein the threshold determination unit determines the threshold value depending on the reception signals and multiple access interference characteristics and Additional White Gaussian Noise (AWGN) characteristics of the reception signals.

7. A ranging method in an Orthogonal Frequency-Division Multiple Access (OFDMA) system, comprising:
a first step of correlating OFDMA reception signals with inverse fast Fourier transformed ranging codes, and outputting correlation result values;
a second step of determining a threshold value depending on characteristics of the reception signals;
a third step of estimating a delay time by selecting a maximum value from among the correlation result values;
a fourth step of, if the maximum value is equal to or greater than the threshold value when the maximum value is compared with the threshold value, detecting a ranging code, and outputting and feeding back the detected ranging code and the estimated delay time;
a fifth step of delaying the fed-back ranging code by the delay time, multiplying a weight by the delayed fed-back ranging code, and then providing a resulting value; and
a sixth step of subtracting the resulting value from the reception signals, generating adjusted reception signals, and repeating the first to fifth steps with respect to the adjusted reception signals.

8. The ranging method according to claim 7, wherein the third step is performed to estimate the delay time corresponding to the maximum value of the correlation result values by using the following equation:

$$\hat{\tau}_m = \arg\max\{|r_m(\tau_m)|: \tau=0,\ldots,\tau_{max}\}$$

where m is the m-th user, $\tau$ is the delay time according to propagation distance (propagation delay time), $\tau_m$ is the propagation delay time of the m-th user, $\tau_{max}$ is the maximum delay time according to propagation distance (the maximum delay time), $\hat{\tau}_m$ is the estimated delay time corresponding to the maximum value of the correlation result values, and $r_m(\tau_m)$ is each correlation result value.

9. The ranging method according to claim 8, wherein the fourth step is performed to detect the ranging code using the estimated delay time, the ranging code being detected by the following equation:

$$|r_m(\hat{\tau}_m)| = \begin{cases} |s_m + I + W|, & m \in \hat{C}_i \\ |I + W|, & \text{otherwise} \end{cases}$$

$$\hat{C}_i = |r_m(\hat{\tau}_m)| > \eta$$

where $r_m(\hat{\tau}_m)$ is a correlation result value at the estimated delay time $\tau_m$, $S_m$ is a ranging code, I is multiple access interference, W is Additional White Gaussian Noise (AWGN), $\eta$ is the threshold value, and $\hat{C}_i$ is the absolute value of the correlation result value at the estimated delay time corresponding to the maximum value of the correlation result values, greater than the threshold value.

10. The ranging method according to claim 7, wherein the fifth step is performed to delay the fed-back ranging code by the delay time and multiply the weight by the delayed ranging code to output the resulting value, which is represented by the following equation:

$$\alpha \cdot S_m(t - \hat{\tau}_m)$$

where α is the weight, $S_m$ is a ranging code, t is time, and $S_m(t-\hat{\tau}_m)$ is a signal delayed by the estimated delay time $\hat{\tau}_m$.

11. The ranging method according to claim 10, wherein the sixth step is performed to repeat the first to fifth steps with respect to the adjusted reception signals represented by the following equation:

$$r_{M-1}(t) = r_M(t) - \alpha \cdot S_m(t-\hat{\tau}_m)$$

where $r_M(t)$ is the reception signal and $r_{M-1}(t)$ is the signal excluding the reception signal related to the ranging code and the delay time of an m-th user terminal and predicted by ranging process from among reception signals.

12. The ranging method according to claim 7, wherein the second step is performed to determine the threshold value depending on the reception signals and multiple access interference characteristics and Additional White Gaussian Noise (AWGN) characteristics of the reception signals.

* * * * *